(12) United States Patent
Kawahigashi et al.

(10) Patent No.: US 7,074,045 B2
(45) Date of Patent: Jul. 11, 2006

(54) PORTABLE TERMINAL DEVICE AND OPEN/CLOSE DETECTOR

(75) Inventors: Yutaka Kawahigashi, Kawasaki (JP); Atsuko Yamamoto, Kawasaki (JP); Toshiyuki Itoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 19 days.

(21) Appl. No.: 10/779,818

(22) Filed: Feb. 18, 2004

(65) Prior Publication Data

US 2005/0020097 A1    Jan. 27, 2005

(30) Foreign Application Priority Data

Jul. 22, 2003    (JP)    ............... 2003-277203

(51) Int. Cl.
*H01R 11/30*    (2006.01)
*H01R 13/60*    (2006.01)

(52) U.S. Cl. ........................................ 439/38
(58) Field of Classification Search ............ 439/38–40
See application file for complete search history.

(56) References Cited

U.S. PATENT DOCUMENTS

| | | | |
|---|---|---|---|
| 5,293,523 A | 3/1994 | Posey | 335/205 |
| 6,314,183 B1 * | 11/2001 | Pehrsson et al. | 379/433.06 |
| 2001/0041543 A1 | 11/2001 | Lim | 455/90 |
| 2002/0119802 A1 | 8/2002 | Hijii | 455/550 |
| 2003/0119545 A1 | 6/2003 | Hosoi | 455/550 |

FOREIGN PATENT DOCUMENTS

| | | |
|---|---|---|
| DE | 1 748 664 | 7/1957 |
| DE | 1 805 188 | 2/1960 |
| DE | 199 05 302 A1 | 8/1999 |
| JP | 9-166405 | 6/1997 |
| JP | 2002-125025 | 4/2002 |
| JP | 2002-204294 | 7/2002 |
| JP | 2002-344592 | 11/2002 |

OTHER PUBLICATIONS

European Search Repot dated Mar. 14, 2005.

* cited by examiner

Primary Examiner—Javaid H. Nasri
(74) Attorney, Agent, or Firm—Staas & Halsey LLP

(57) ABSTRACT

A portable terminal device which having a lower part; an upper part openable and closable in relation to the lower part; a magnet and a magnetic sensor attached to the lower part; and a magnetic plate which is attached to the upper part and leads the magnetic force of the magnet to the magnetic sensor, when the upper part is closed over the lower part.

6 Claims, 11 Drawing Sheets

PORTABLE TERMINAL DEVICE AND OPEN/CLOSE DETECTOR

BACKGROUND OF THE INVENTION

1. Field of the Invention

The present invention relates to a portable terminal device which has an openable and closable part as well as to an open/close detector which detects the opening and closing of the part.

2. Description of the Related Art

Conventionally, various portable terminal devices such as folding phones are equipped with an open/close mechanism such as a folding mechanism that contains an open/close detector which detects the opening and closing of the open/close mechanism.

For example, Japanese Reference Nos. 9-166405, 2002-125025 and 2002-204294 disclose a structure for use in a foldable device, such as a folding phone, equipped with a magnet on one of the parts which face each other when the device is folded, and a magnetic sensor on the other part, so that the magnetic sensor will detect magnetic force of the magnet when the device is folded.

FIGS. 1 and 2 are schematic diagrams showing an open/close detector disclosed in the three above-cited Japanese references, with FIG. 1 showing the folding phone when it is open and FIG. 2 showing the folding phone when it is closed.

The folding phone 10 shown in FIGS. 1 and 2 consists of a lower part 11 and an upper part 12 pivotably supported by the lower part 11. The upper part 12 folds in the direction of arrow A in FIG. 1 and unfolds in the direction of arrow B with respect to the lower part 11. The lower part 11 contains a circuit board 112 in its case 111. A magnetic sensor 113 is attached securely to the circuit board 112. The upper part 12 has a magnet 122 attached securely to a position in the case 121 which faces the magnetic sensor 113 when the folding phone 10 is folded (see FIG. 2).

FIGS. 3 and 4 are explanatory diagrams illustrating the principle of open/close detection of the folding phone shown in FIGS. 1 and 2. FIG. 3 shows a case in which the distance "a" between the magnetic sensor 113 and magnet 122 is sufficiently large while FIG. 4 shows a case in which the distance "a" between the magnetic sensor 113 and magnet 122 is sufficiently small.

When the magnet 122 is away from the magnetic sensor 113 as shown in FIG. 3, the magnetic sensor 113 cannot detect the magnetic force of the magnet 122, and detects only that the upper part 12 of the folding phone 10 is away from the lower part 11 (i.e., the folding phone 10 is open). On the other hand, if the magnet 122 is close enough to the magnetic sensor 113 as shown in FIG. 4, the magnetic sensor 113 detects the magnetic force of the magnet 122 and detects that the upper part 12 is close enough to the lower part 11 (i.e., the upper part 12 is folded over the lower part 11 (the folding phone 10 is closed)).

FIG. 5 is a schematic diagram showing a flip phone equipped with a conventional open/close detector.

The flip phone 20 shown in FIG. 5 consists of a main part 21 and a flipper 22 pivotably supported by the main part 21. The flipper 22 opens and closes with respect to the main part 21 in the directions of arrows C and D.

The main part 21 contains a circuit board 212 in its case 211. A magnetic sensor 213 is mounted on the circuit board 212. Within the case 221 of the flipper 22, a magnet 222 secured to the case 221 is attached securely to a position which faces the magnetic sensor 213 when the flipper 22 is closed.

With this flip phone, again the opening and closing of the flipper 22 is detected according to the principle described with reference to FIGS. 3 and 4.

FIG. 6 is a schematic diagram of a sliding phone equipped with a conventional open/close detector while FIG. 7 is a sectional view taken along line X—X in FIG. 6.

The sliding phone 30 in FIG. 6 consists of a main part 31 and sliding part 32. The sliding part 32 fits over the main part 31 as shown in FIG. 7 and can slide along the main part 31 in the direction perpendicular to the paper in FIG. 7, i.e., in the directions of arrows E and F in FIG. 6.

The main part 31 of the sliding phone 30 contains a circuit board 312 in its case 311. A magnetic sensor 313 is attached securely to that position of the circuit board 312 with which the sliding part 32 overlaps when the sliding part 32 is closed, i.e., when the sliding part 32 slides in the direction of arrow F in FIG. 6. Also, within the case 321 of the sliding part 32 of the sliding phone 30, a magnet 322 is attached to a position which faces the magnetic sensor 313 when the sliding part 32 is closed.

With this sliding phone, again the opening and closing of the sliding part 32 is detected according to the principle described with reference to FIGS. 3 and 4.

Although not shown, another example of a cell phone equipped with an open/close mechanism is a cell phone consisting of an upper part and a lower part which pivots around a pivot shaft perpendicular to the front face of the upper part and equipped with a so-called turn-type open/close mechanism in which the lower part turns 180 degrees between a closed state in which the lower part covers the front face of the upper part completely and an open state in which the lower part reveals the front face of the upper part, as shown in Japanese Reference No. 2002-344592.

Although the configuration which is disclosed in and the first three above-cited Japanese references detects opening and closing by means of a magnetic sensor attached to one part and a magnet attached to the other part is applicable to various types of cell phone and a wide range of other portable terminal devices as described with reference to FIGS. 1 to 7, since the magnetic sensor and magnet, which are contained in different cases, must be disposed in opposing relation to each other when the phone is closed, there is the problem that extra man hours are required for position adjustment. There is also the problem that dropping the device, or the likes may cause misalignment between the magnetic sensor and magnet, resulting in detection failure. With this detection mechanism, the magnetic sensor and magnet align in the thickness direction of the closed cell phone in a closed state. This makes it necessary to internally mount the magnet using a dual structure, increasing the thickness of the closed cell phone because of a complicated magnet-fastening structure and the like, and thus goes against the demand for thickness reductions.

SUMMARY OF THE INVENTION

In view of the above circumstances, the present invention has an object to provide an open/close detector which has a reduced thickness and allows easy position adjustment during assembly as well as to provide a portable terminal device equipped with the open/close detector.

To achieve the above object, the present invention provides a portable terminal device equipped with a first part and a second part openable and closable in relation to the first part, the portable terminal device including: a magnet and a magnetic sensor attached to one of the first part and the second part; and a magnetic body which is attached to the other of the first part and the second part and leads magnetic force of the magnet attached to the one of the two parts to the magnetic sensor attached to the one of the two parts when the second part is closed over the first part.

The magnetic body here may be a magnetic plate attached to the other of the two parts or may constitute at least part of a casing of the other of the two parts.

Preferably, the magnet and magnetic sensor may be combined into a single unit.

Also, in the portable terminal device of the present invention, the second part maybe pivotably coupled to the first part and open and close as it pivots toward and away from the first part or it may be slidably coupled to the first part and open and close as it slides toward and away from the first part.

Furthermore, in the portable terminal device of the present invention, any configuration may be used to pivotably couple the second part to the first part, including a folding-type, flip-type, and turn-type.

To achieve the above objects, the present invention provides a portable terminal device equipped with a first part and a second part openable and closable in relation to the first part, the portable terminal device including: a magnet and a magnetic sensor attached to one of the first part and the second part; and a magnetic body which is attached to the other of the first part and the second part and leads magnetic force of the magnet attached to the one of the two parts to the magnetic sensor attached to the one of the two parts when the second part is closed over the first part.

According to the present invention, both magnet and magnetic sensor are attached to one of the first part and second part which opens and closes in relation to the first part. The other part needs only to be equipped with, for example, a very thin—e.g., foliate—magnetic plate. Then, by placing the magnetic sensor and magnet side by side, it is possible to reduce the thickness of the closed cell phone.

Also, by making the area of the magnetic body such as the magnetic plate a little larger, it is possible to do detection without problems even if the magnet and magnetic sensor are misaligned to some extent. This makes it easy to adjust placement locations during assembly, eliminating the need for special position adjustments.

DETAILED DESCRIPTION OF THE PREFERRED EMBODIMENTS

Embodiments of the present invention will be described below.

Figure 8:
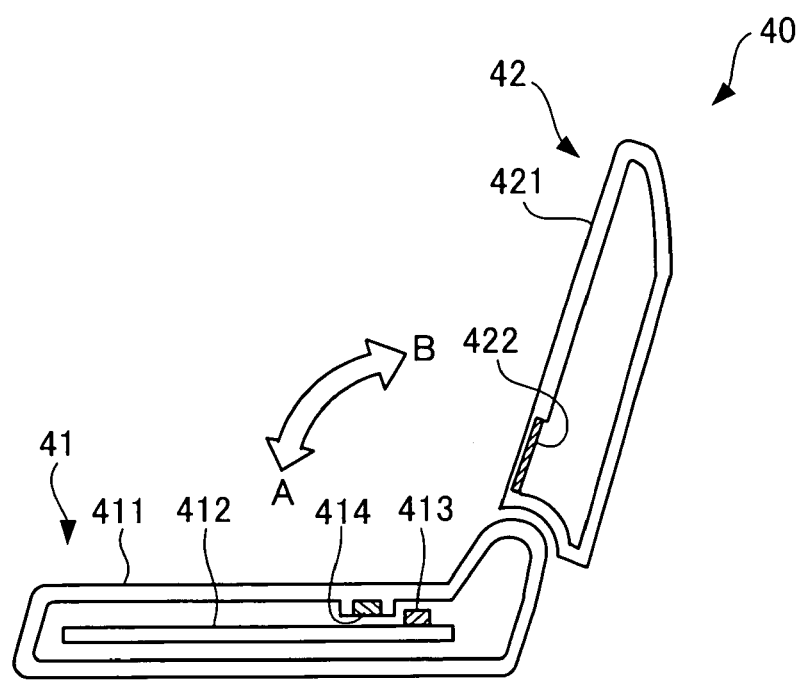
FIG. 8 is a schematic diagram showing a folding phone which is a first embodiment of a portable terminal device according to the present invention, where the phone is unfolded.
Figure 9:
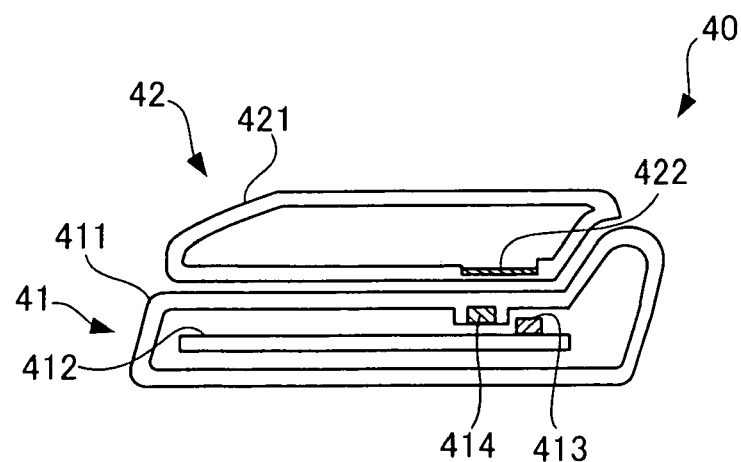
FIG. 9 is a schematic diagram showing the folding phone which is the first embodiment of the portable terminal device according to the present invention, where the phone is folded.

FIGS. 8 and 9 are schematic diagrams showing a folding phone which is a first embodiment of a portable terminal device according to the present invention, where FIG. 8 shows an open state and FIG. 9 shows a closed state.

The folding phone 40 shown in FIGS. 8 and 9 consists of a lower part 41 and an upper part 42 pivotably supported by the lower part 41. The upper part 42 pivots with respect to the lower part 41 in the directions of arrows A and B in FIG. 8 to switch between a closed state. (folded state) (see FIG. 9) and open state (see FIG. 8).

The lower part 41 contains a circuit board 412 in its case 411. A magnetic sensor 413 is mounted on the circuit board 412. Within the case 411 of the lower part 41, a magnet 414 is mounted securely alongside the magnetic sensor 413.

On the other hand, within the case 421 of the upper part 42, a magnetic plate 422 is attached securely to a position which faces both the magnetic sensor 413 and magnet 414 when the folding phone 40 is folded as shown in FIG. 9.

Figure 10:
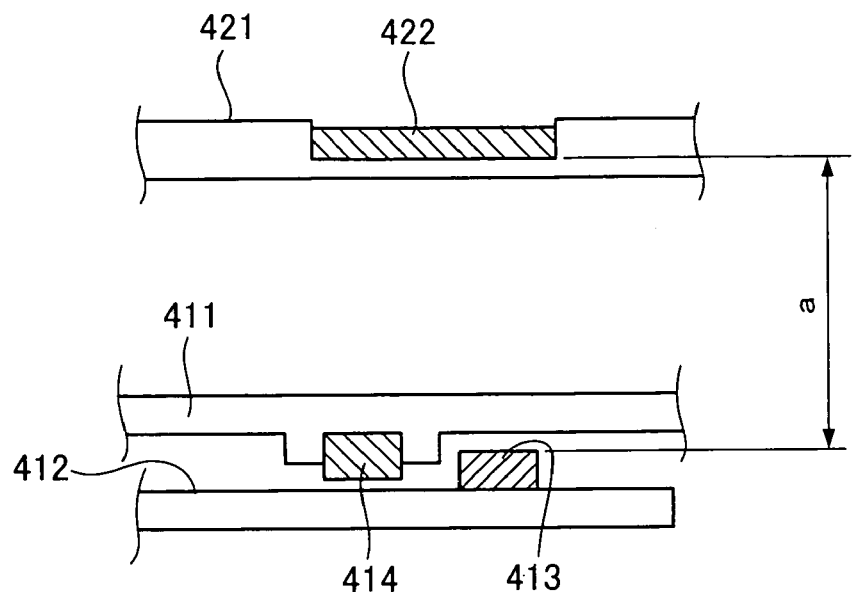
FIG. 10 is an explanatory diagram illustrating the principle of open/close detection of the folding phone.
Figure 11:
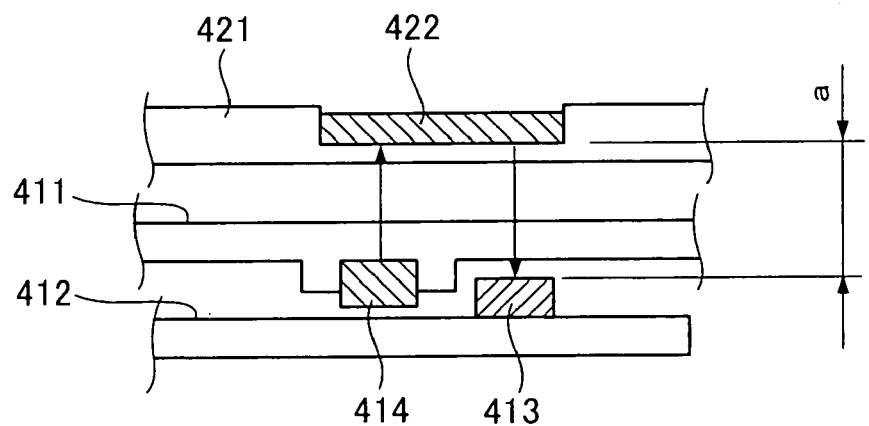
FIG. 11 is an explanatory diagram illustrating the principle of open/close detection of the folding phone.

FIGS. 10 and 11 are explanatory diagrams illustrating the principle of open/close detection of the folding phone shown in FIGS. 8 and 9.

FIG. 10 shows a case in which the distance "a" of the magnetic plate 422 from both magnetic sensor 413 and magnet 414 is sufficiently large while FIG. 11 shows a case in which the distance "a" of the magnetic plate 422 from both magnetic sensor 413 and magnet 414 is sufficiently small.

The magnet 414 and magnetic sensor 413 are oriented with respect to each other in such a way that the magnetic force of the magnet 414 is not detected by the magnetic sensor 413. When the magnetic plate 422 is distant as shown in FIG. 10, the magnetic sensor 413 does not detect the magnetic force of the magnet 414, and thus determines that the upper part 42 is not folded over the lower part 41 of the folding phone 40 shown in FIGS. 8 and 9.

On the other hand, when the magnetic plate 422 is close enough to the magnetic sensor 413 and magnet 414 as shown in FIG. 11, the magnetic force of the magnet 414 is transmitted through the magnetic plate 422 to the magnetic sensor 413. Consequently, the magnetic sensor 413 detects the magnetic force of the magnet 414. Thus, the magnetic sensor 413 determines that the upper part 42 is folded over the lower part 41 (see FIG. 9) of the folding phone 40 shown in FIGS. 8 and 9.

Figure 1:
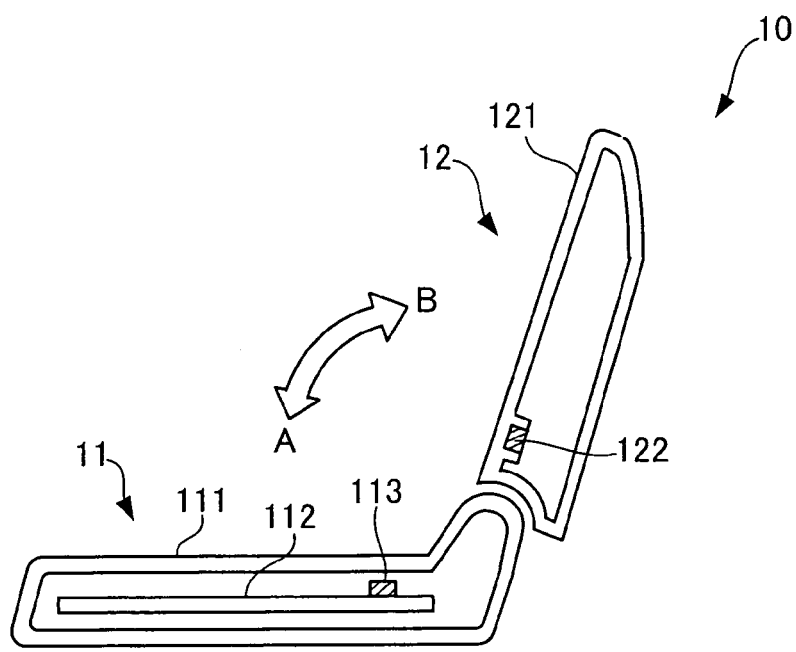
FIG. 1 is a schematic diagram showing a folding phone equipped with a conventional open/close detector, where the phone is unfolded.
Figure 2:
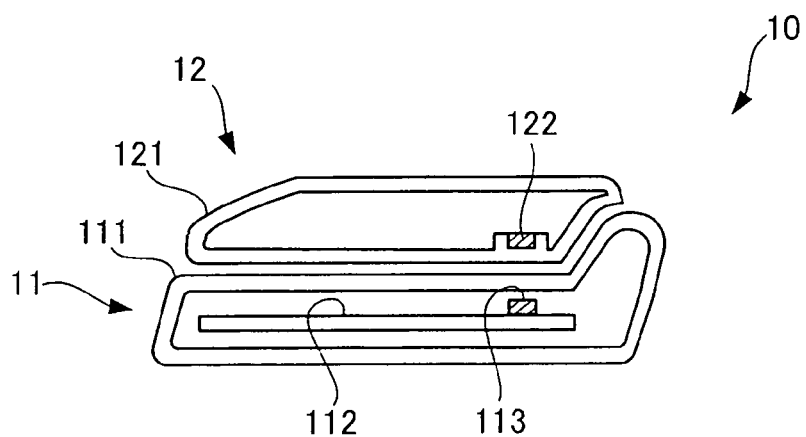
FIG. 2 is a schematic diagram showing the folding phone equipped with the conventional open/close detector, where the phone is folded.
Figure 3:
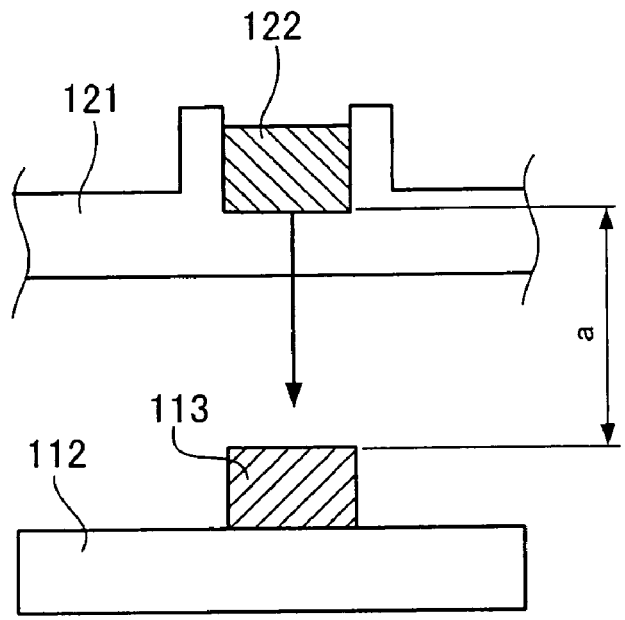
FIG. 3 is an explanatory diagram illustrating the principle of open/close detection of the folding phone.
Figure 4:
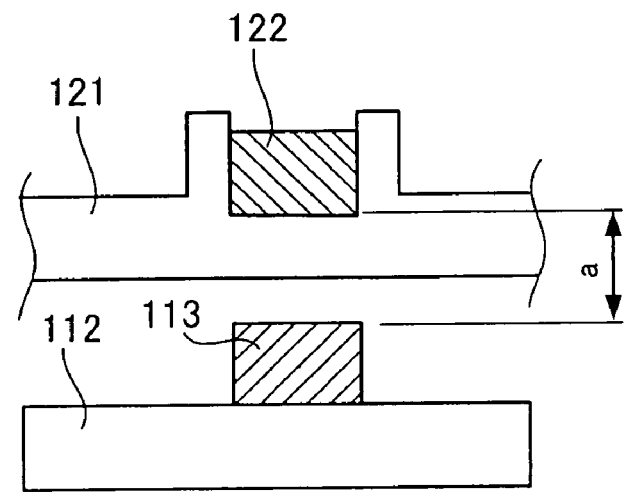
FIG. 4 is an explanatory diagram illustrating the principle of open/close detection of the folding phone.

In the folding phone 40 shown in FIGS. 8 and 9, the magnetic sensor 413 and magnet 414 are placed almost side by side in the lower part 41, making it possible to use a thin sheet for the magnetic plate 422. Consequently, the folding phone is made thinner than the conventional folding phone shown in FIGS. 1 and 2 where the magnetic sensor and magnet are placed in the direction of thickness.

By making the magnetic plate 422 a little wider, it is possible to ensure reliable detection even if the magnetic sensor 413 and magnet 414 are a little out of alignment, reduce the man hours required for position adjustments during assembly, and provide a structure resistant to misalignment due to dropping, or the like.

Figure 12:
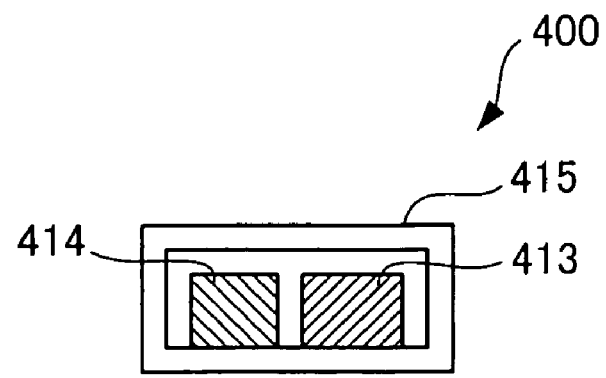
FIG. 12 is a schematic diagram showing a unitized sensor module.
Figure 13:
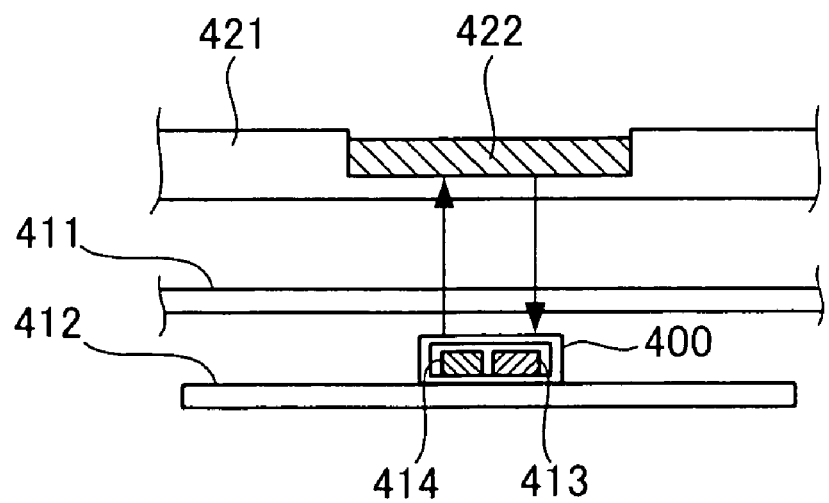
FIG. 13 is a diagram showing an example of how the sensor module is used.

FIG. 12 is a schematic diagram showing a unitized sensor module while FIG. 13 a diagram showing an example of how the sensor module is used.

In FIG. 12, the magnetic sensor 413 and magnet 414 are contained in the same case 415 to compose a sensor unit 400.

The use of the sensor unit 400 further reduces the number of assembly operations because, as shown in FIG. 13, the sensor unit 400 can be mounted on the circuit board 412 using the same number of man hours as when mounting the magnetic sensor 413 shown in FIGS. 8 and 9 on the circuit board 412 and there is no need to fasten the magnet 414 to the case 411 separately from the magnetic sensor 413 (see FIGS. 8 and 9). Also, the integration of the magnetic sensor 413 and magnet 414 prevents their misalignment, and thus further improves the reliability of open/close detection.

Figure 14:
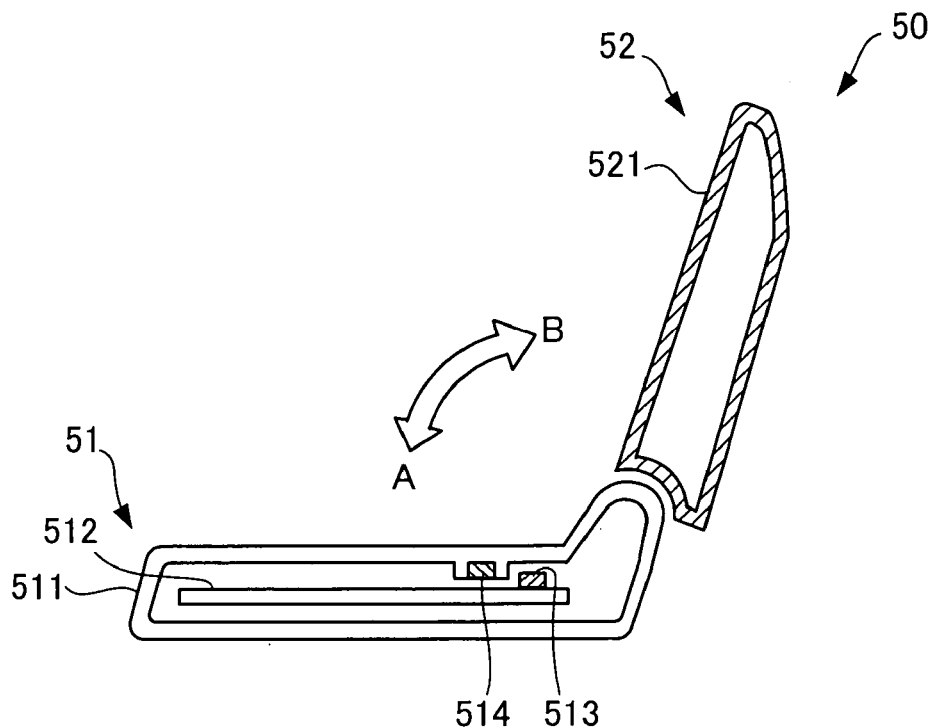
FIG. 14 is a schematic diagram showing a folding phone which is a second embodiment of a portable terminal device according to the present invention, where the phone is unfolded.
Figure 15:
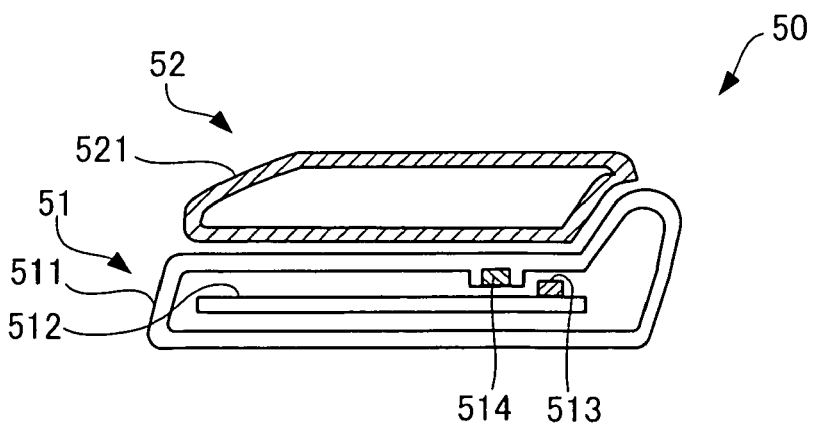
FIG. 15 is a schematic diagram showing the folding phone which is the second embodiment of the portable terminal device according to the present invention, where the phone is folded.

FIGS. 14 and 15 are schematic diagrams showing a folding phone which is a second embodiment of a portable terminal device according to the present invention, where FIG. 14 shows an open state and FIG. 15 shows a closed state.

A folding phone 50 shown in FIGS. 14 and 15 consists of a lower part 51 and an upper part 52 pivotably supported by the lower part 51, as is the case with the folding phone according to the first embodiment shown in FIGS. 8 and 9. The upper part 52 pivots with respect to the lower part 51 in the directions of arrows A and B in FIG. 14 to switch between a closed state (folded state) (see FIG. 15) and open state (see FIG. 14).

The lower part 51 contains a circuit board 512 in its case 511. A magnetic sensor 513 is mounted on the circuit board 512. Within the case 511 of the lower part 51, a magnet 514 is mounted securely alongside the magnetic sensor 513.

On the other hand, the case 521 of the upper part 52 contains no element for open/close detection. Instead, the case 521 itself of the upper part 52 is made of magnetic material.

Thus, according to the second embodiment shown in FIGS. 14 and 15, the case 521 itself of the upper part 52 operates in the same manner as the magnetic plate 422 shown in FIGS. 10 and 11, and the opening and closing of the upper part 52 with respect to the lower part 51 are detected again according to the principle described with reference to FIGS. 10 and 11.

Incidentally, although the entire case 521 of the upper part 52 is made of magnetic material according to the second embodiment, alternatively only that part of the case 521 of the upper part 52 may be made of magnetic material which overlaps the magnetic sensor 513 and magnet 514 when the folding phone 50 is folded (closed) as shown in FIG. 15.

Figure 16:
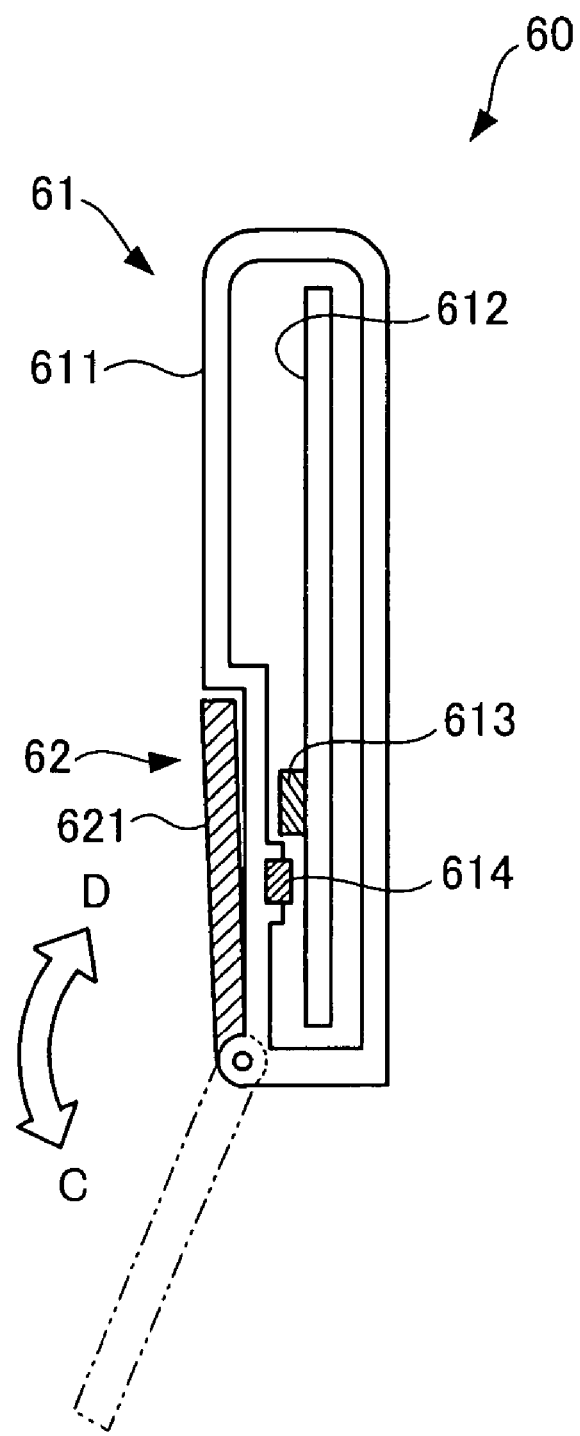
FIG. 16 is a schematic diagram showing a flip phone which is a third embodiment of the present invention.

FIG. 16 is a schematic diagram showing a flip phone which is a third embodiment of the present invention.

The flip phone 60 shown in FIG. 16 consists of a main part 61 and a flipper 62 pivotably supported by the main part 61. The flipper 62 opens and closes with respect to the main part 61 in the directions of arrows C and D.

The main part 61 contains a circuit board 612 in its case 611. A magnetic sensor 613 is mounted on that position of the circuit board 612 with which the flipper 62 overlaps when the flipper 62 is closed. Within the case 611 of the main part 61, a magnet 614 is mounted securely almost alongside the magnetic sensor 613 mounted on the circuit board 612.

Regarding the flipper 62, a plate member 621 itself composing the flipper 62 is made of magnetic material.

With this flip phone 60, again the opening and closing of the flipper 62 is detected according to the principle described with reference to FIGS. 10 and 11.

Figure 5:
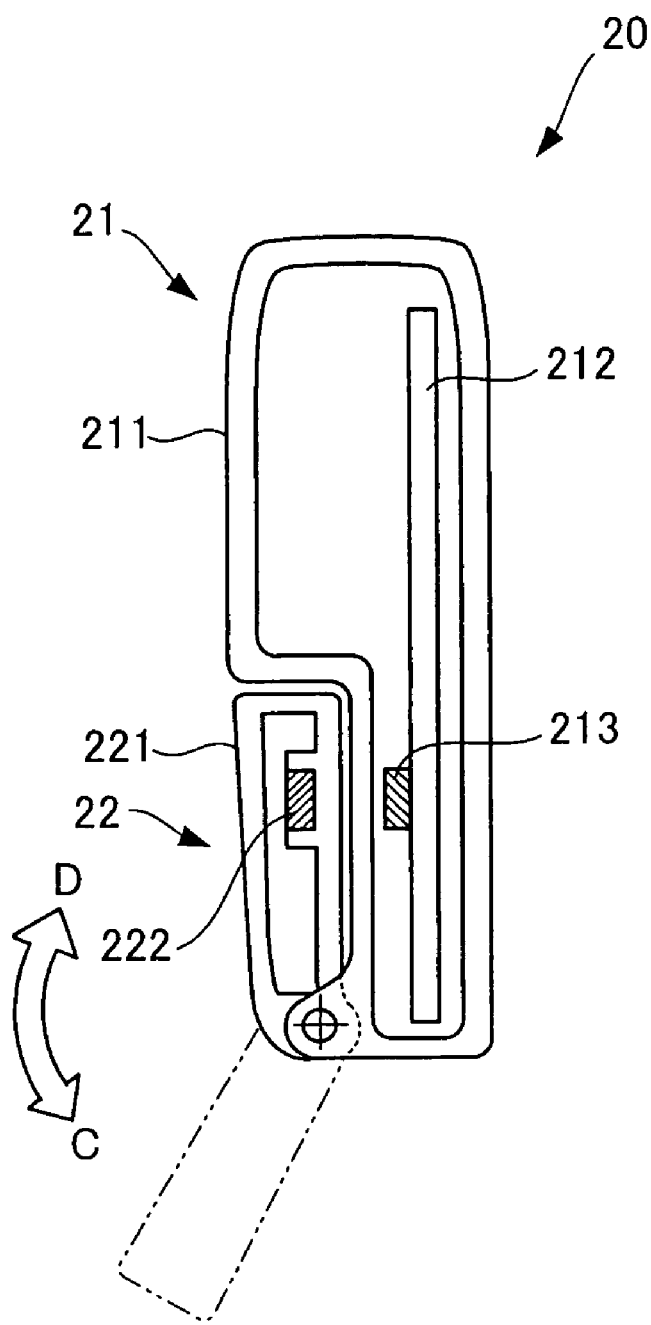
FIG. 5 is a schematic diagram showing a flip phone equipped with a conventional open/close detector.

The flip phone 60 is thinner in overall thickness as well as in the thickness of the flipper than the flip phone 20 in FIG. 5 equipped with a conventional open/close detector.

Figure 17:
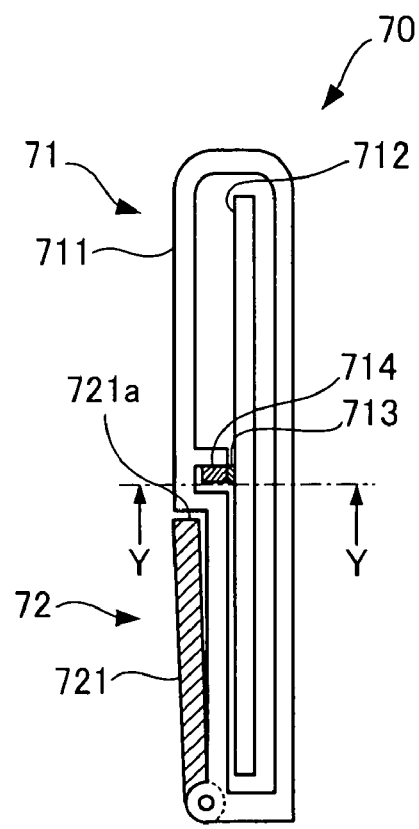
FIG. 17 is a schematic diagram showing a flip phone which is a fourth embodiment of the present invention.
Figure 18:
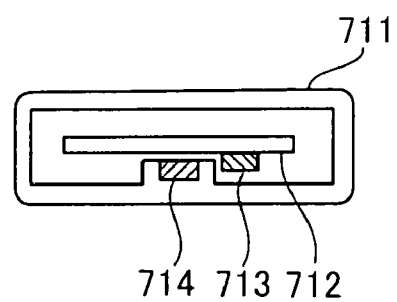
FIG. 18 is a sectional view taken along line Y—Y in FIG. 17.

FIG. 17 is a schematic diagram showing a flip phone which is a fourth embodiment of the present invention while FIG. 18 is a sectional view taken along line Y—Y in FIG. 17.

As with the flip phone 60 shown in FIG. 16, the flip phone 70 shown in FIGS. 17 and 18 consists of a main part 71 and a flipper 72 pivotably supported by the main part 71, where the flipper 72 opens and closes with respect to the main part 71 in the same directions as arrows C and D shown in FIG. 16.

The main part 71 contains a circuit board 712 in its case 711. A magnetic sensor 713 is mounted on that position of the circuit board 712 which faces the upper end face 721a of a plate member 721 composing the flipper 72 when the flipper 72 is closed. Also, within the case 711 of the main part 71, a magnet 714 is attached securely to a position which is adjacent to the magnetic sensor 713 and which faces the upper end face 721a of the plate member 721 when the flipper 72 is closed. The magnetic sensor 713 and magnet 714 are placed in such a way as to almost overlap each other in a direction perpendicular to the paper in FIG. 17. On the other hand, the plate member 721 composing the flipper 72 is made of magnetic material.

In the flip phone 70 shown in FIGS. 17 and 18, the magnetic sensor 713 and magnet 714 are oriented with respect to each other in such a way that the magnetic force of the magnet 714 enters the plate member 721 of the closed flipper 72 through the upper end face 721a and exits the plate member 721 through the upper end face 721a where it is detected by the magnetic sensor 713.

The flip phone 70 shown in FIGS. 17 and 18 differs from, for example, the flip phone 60 shown in FIG. 16 in the direction of the magnetic sensor 713 and magnet 714 and in that the upper end face 721a of the plate member 721 of the flipper 72 is used, but the opening and closing of the flipper 72 with respect to the main part 71 is detected according to the principle described with reference to FIGS. 10 and 11.

Again, it is possible to avoid overlap between the magnetic sensor 713 and magnet 714 in the direction of thickness, and thus reduce the thickness of the flip phone 70.

Figure 19:
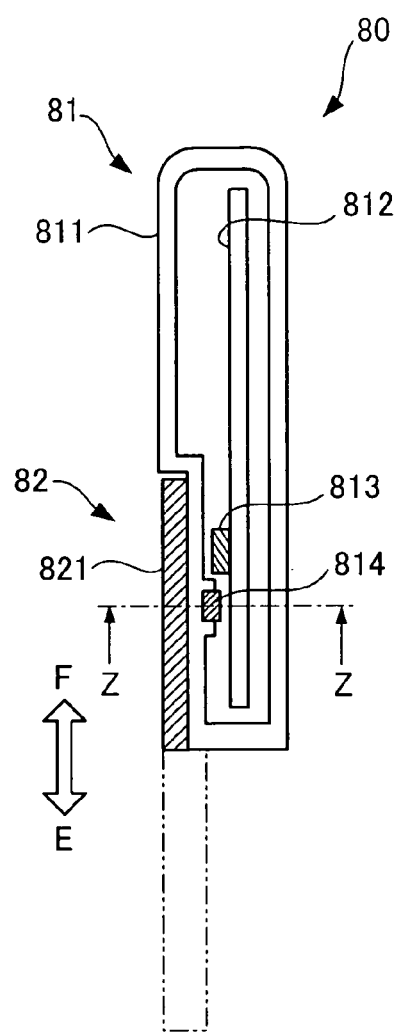
FIG. 19 is a schematic diagram showing a sliding phone which is a fifth embodiment of the present invention.
Figure 20:
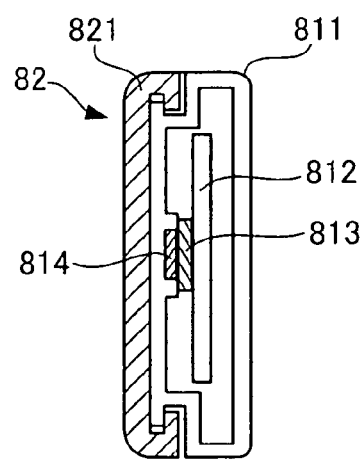
FIG. 20 is a sectional view taken along line Z—Z in FIG. 19.

FIG. 19 is a schematic diagram showing a sliding phone which is a fifth embodiment of the present invention while FIG. 20 is a sectional view taken along line Z—Z in FIG. 19.

The sliding phone 80 shown in FIGS. 19 and 20 consists of a main part 81 and a sliding part 82. The sliding part 82 fits over the main part 81 as shown in FIG. 20 and can slide along the main part 81 in the direction perpendicular to the paper in FIG. 20, i.e., in the directions of arrows E and F in FIG. 19.

The main part 81 of the sliding phone 80 contains a circuit board 812 in its case 811. A magnetic sensor 813 is attached securely to that position of the circuit board 812 with which the sliding part 82 overlaps when the sliding part 82 is closed, i.e., when the sliding part 82 slides in the direction of arrow F in FIG. 19.

Also, within the case 811 of the main part 81 of the sliding phone 80, a magnet 814 is attached securely, side by side with the magnetic sensor 813 mounted on the circuit board 812 in such a way as to face a member 821 composing the sliding part 82 when the sliding part 82 is closed. Incidentally, the member 821 itself composing the sliding part 82 is made of magnetic material.

Figure 6:
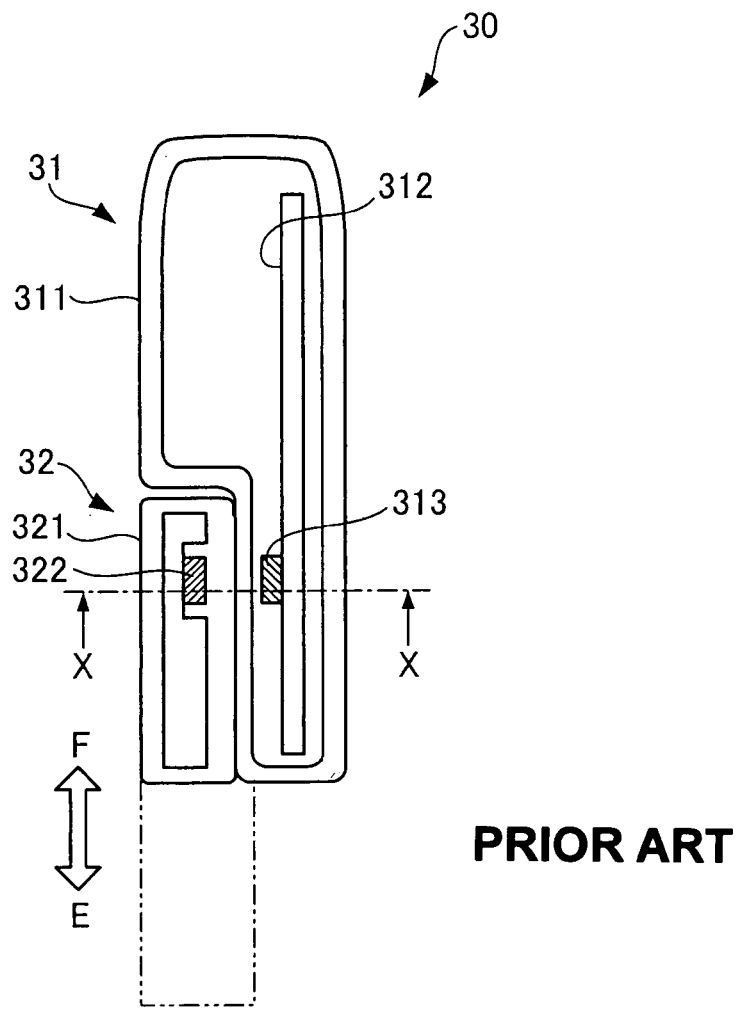
FIG. 6 is a schematic diagram of a sliding phone equipped with a conventional open/close detector.
Figure 7:
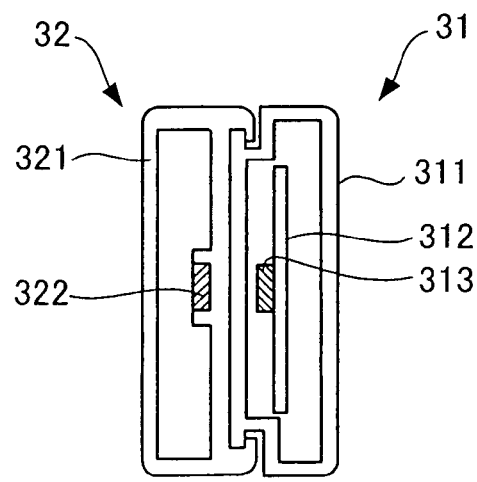
FIG. 7 is a sectional view taken along line X—X in FIG. 6.

With this sliding phone 80, again the opening and closing of the sliding part 82 is detected according to the principle described with reference to FIGS. 10 and 11. Also, since the magnetic sensor 813 and magnet 814 do not overlap in the direction of thickness, the sliding phone 80 can be made thinner in overall thickness as well as in the thickness of the sliding part than the conventional one shown in FIGS. 6 and 7. Besides, the sliding phone 80 has greater tolerance for misalignment of the magnetic sensor 813 and magnet 814 than do conventional sliding phones, as is the case with the other embodiments described above.

Incidentally, although cell phones have been described above, the present invention is not limited to cell phones. It can be applied to any type of portable terminal device, such as a PDA (Personal Digital Assistant), equipped with a part which opens and closes.

What is claimed is:

1. A portable terminal device equipped with a first part and a second part openable and closable in relation to the first part, the portable terminal device comprising:
   a magnet and a magnetic sensor which are received in a one piece module, and said module is received in one of the first part and the second part; and
   a magnetic body which is attached to the other of the first part and the second part and leads magnetic force of the magnet to the magnetic sensor when the second part is closed over the first part.

2. The portable terminal device according to claim 1, wherein the magnetic body is a magnetic plate attached to the other of the first part and the second part.

3. The portable terminal device according to claim 1, wherein the magnetic body constitutes at least part of a casing of the other of the first part and the second part.

4. The portable terminal device according to claim 1, wherein the second part is pivotably coupled to the first part and opens and closes by pivoting toward and away from the first part.

5. The portable terminal device according to claim 1, wherein the second part is slidably coupled to the first part and opens and closes by sliding toward and away from the first part.

6. An open/close detector which is incorporated into a portable terminal device equipped with a first part and a second part openable and closable in relation to the first part and detects opening and closing of the second part in relation to the first part, the open/close detector comprising:
   a magnet and a magnetic sensor which are received in a one piece module, and said module is received in one of the first part and the second part; and
   a magnetic body which is attached to the other of the first part and the second part and leads magnetic force of the magnet to the magnetic sensor when the second part is closed over the first part.

* * * * *